US012058012B1

(12) United States Patent
Viklund (10) Patent No.: US 12,058,012 B1
(45) Date of Patent: *Aug. 6, 2024

(54) SYSTEM AND METHODS FOR SCALABLE CLOUD-BASED PLATFORM AND RELATED APPLICATIONS

(71) Applicant: Grant Viklund, Newton, MA (US)

(72) Inventor: Grant Viklund, Newton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/899,532

(22) Filed: Aug. 30, 2022

Related U.S. Application Data

(63) Continuation of application No. 16/354,010, filed on Mar. 14, 2019, now Pat. No. 11,463,330.

(60) Provisional application No. 62/643,651, filed on Mar. 15, 2018.

(51) Int. Cl.
| | |
|---|---|
| H04L 41/5051 | (2022.01) |
| G06F 9/445 | (2018.01) |
| H04L 67/10 | (2022.01) |
| H04L 67/60 | (2022.01) |
| G06F 9/455 | (2018.01) |
| H04L 67/01 | (2022.01) |

(52) U.S. Cl.
CPC .......... *H04L 41/5051* (2013.01); *G06F 9/445* (2013.01); *H04L 67/10* (2013.01); *H04L 67/60* (2022.05); *G06F 9/45533* (2013.01); *H04L 67/01* (2022.05)

(58) Field of Classification Search
CPC ..... H04L 41/5051; H04L 67/60; H04L 67/10; H04L 67/01; G06F 9/445; G06F 9/45533
See application file for complete search history.

(56) References Cited

U.S. PATENT DOCUMENTS

| | | | | |
|---|---|---|---|---|
| 8,880,678 B1* | 11/2014 | Colton | .................. | G06F 9/5083 |
| | | | | 709/227 |
| 9,418,213 B1* | 8/2016 | Roth | ....................... | H04L 63/08 |
| 10,104,185 B1* | 10/2018 | Sharifi Mehr | .......... | G06F 21/53 |
| 11,304,123 B1* | 4/2022 | Noonan | ................ | H04W 48/16 |
| 11,463,330 B2* | 10/2022 | Viklund | .................. | H04L 67/10 |
| 2003/0097464 A1* | 5/2003 | Martinez | ................... | H04L 9/40 |
| | | | | 709/218 |
| 2005/0201417 A1* | 9/2005 | Ciavaglia | ................ | H04L 69/03 |
| | | | | 370/474 |
| 2013/0198814 A1* | 8/2013 | Zheng | .................... | H04W 12/06 |
| | | | | 726/4 |
| 2013/0318388 A1* | 11/2013 | Mukherjee | ........ | H04W 52/0206 |
| | | | | 713/340 |
| 2015/0350186 A1* | 12/2015 | Chan | ................... | H04L 63/0815 |
| | | | | 726/9 |
| 2016/0065555 A1* | 3/2016 | Branden | ............. | H04L 63/0807 |
| | | | | 726/7 |

(Continued)

*Primary Examiner* — Dhairya A Patel (57) ABSTRACT

The invention is scalable cloud-based platform for computer services. The invention includes a service router configured to receive a connection request to one or more services from each of one or more clients. Upon establishing the connection via appropriate handshake protocol, the connection remains persistent until the requested service is completed. The system further includes a container manager configured to load and process each service of a plurality of services in a separate container and a resource connection manager configured to provide mapping of one or more resources to the loaded services.

19 Claims, 8 Drawing Sheets

(56) References Cited

U.S. PATENT DOCUMENTS

| | | | | |
|---|---|---|---|---|
| 2016/0165663 | A1* | 6/2016 | Shanmugam | H04W 76/12 |
| | | | | 370/338 |
| 2017/0026339 | A1* | 1/2017 | Degenkolb | H04L 63/08 |
| 2017/0163607 | A1* | 6/2017 | Skuratovich | H04L 63/061 |
| 2017/0177413 | A1* | 6/2017 | Wisniewski | G06F 9/5027 |
| 2017/0220281 | A1* | 8/2017 | Gupta | G06F 3/0604 |
| 2017/0310767 | A1* | 10/2017 | Flynn, IV | H04L 67/53 |
| 2018/0295197 | A1* | 10/2018 | Vedula | H04L 67/565 |
| 2019/0158497 | A1* | 5/2019 | Diaz Cuellar | H04L 63/108 |
| 2023/0401274 | A1* | 12/2023 | Denninghoff | G06Q 30/0251 |

\* cited by examiner

SYSTEM AND METHODS FOR SCALABLE CLOUD-BASED PLATFORM AND RELATED APPLICATIONS

CROSS-REFERENCE TO RELATED APPLICATIONS

The present application is a continuation of U.S. patent application Ser. No. 16/354,010, filed on Mar. 14, 2019, which claims the benefit of U.S. Provisional Application Ser. No. 62/643,651, filed on Mar. 15, 2018, the specification of which is herein incorporated by reference.

BACKGROUND OF THE INVENTION

Field of the Invention

Embodiments of the invention relates to the field of cloud computing. More specifically, the invention relates to system and methods for scalable cloud-based computing platform and related applications.

Description of the Related Art

The operability of the internet is due to its scalability and interoperability. In part, such scalability and interoperability are enabled by standardized message formats, protocols, and addressing schemes. The internet takes advantage of URI (universal resource identifier) addressing to find endpoints. Traditionally, endpoints were software components supporting remote procedure calls. However, a model for network-based computing uses a representational state transfer (REST) paradigm. In the REST paradigm, sources of specific information are called resources and are identified, typically, by a URI. A connector may mediate the requests made for resources. Servers, caches, tunnels, etc., are all examples of connectors. Each may make or forward a request without explicit knowledge of where the actual resource may be. Under the REST paradigm, the connection is a non-persistent, web server based, temporary connection.

To build large-scale applications, developers use an architecture structure known as microservices. Microservices means that rather than using a single, monolithic codebase, software developers break down each application into a collection of smaller components called microservices that can later be linked together to form the larger application. This approach offers several benefits, including the ability to scale individual microservices, keep the codebase easier to understand and test, and enable the use of different programming languages, databases, and other tools for each microservice. In addition, each microservice can be easily deployed, scaled, and collaborated on by a developer team. However, each microservice manages its own access to resources, which could be tasking thereby limiting the scalability of the application.

Resources may be owned by one entity, hosted by another entity, and support connectors may be located from virtually anywhere. Varying requirements for security resulting from this variety may prevent transparent operation of such a mesh of resources, because different participants may have different requirements for security. In addition, not all participants may support the same security processes and protocols.

For example, one resource owner may require public key authentication and support only elliptic curve key types. However, a requester attempting to use that resource may support only RSA (Rivest-Shamir-Adleman) key types thus creating incompatibility issues. Further, the requester may traverse a network that requires a SSL2 secure communication protocol for transport security while other available paths may not require such security.

BRIEF SUMMARY OF THE INVENTION

One or more embodiments of the invention are directed a system and methods for scalable cloud-based platform and related applications. The invention comprises a high scalability and extendable agent that provides microservice style processing using bidirectional communication over persistent connections on a digital network. The server application removes the need for traditional microservices that are run as their own system processes or applications by providing a plugin interface for services to be run inside the Agent as part of its process(es).

The agent software can be written for example as a script, byte compile application or native application and the launch process is handled by the native Host Operating System's launch cycle. The Launching of the software on the host can be managed and monitored by the Infrastructure set-up by the operator.

After launch, the system loads the configuration descriptions for resources and services. Configuration descriptions can be included in the application or may be loaded by the software in any software readable format from such examples as file system or network service. These configuration descriptions can range from plain text to fully encrypted data sources only readable by the application and can be loaded from anywhere the software has access to.

In one or more embodiments, after loading of the agent, the system connects to network resources for which permission has been obtained. If the Agent does not already have network connections to the resource, it will work to establish one based on the infrastructure's credentialing requirement (e.g. password, token, pub-private key, etc.) and maintain the connection for whichever services require it. The list of resources can be explicitly provided or inferred by the services being loaded.

In one or more embodiments, after connecting the network resources, the system creates resource mapping for the loaded services. Based on service configuration and requirements, the Agent application provides a connection manager that maps the real application level connection to a resource or resource subset and provides it to the service that functions like any regular input/output connection, code variable or object. This mapping is unique and transparent to each service and provides an abstraction layer for extra data control by the operators. This connection manager is immutable after creation. The connection manager shares the network connections to resources without the services being aware or hindered by the sharing of resources. These resources can be anywhere from full access to a database server, to limited access to a couple of records in a Cache Table. Either way they are provided abstracted so the service is unaware of the underlying infrastructure. This provides security and efficiency, by limiting access to resources.

One or more embodiments of the invention comprises an agent running on one or more network servers in a cloud environment. The agent comprises a service router configured to receive a connection request to one or more services from each of one or more clients, wherein the service router establishes a persistent connection with said each of the one or more clients upon receiving the connection request.

One or more embodiments of the invention further comprises a container manager configured to load and process each of the one or more services in a separate container.

One or more embodiments of the invention further comprises a resource connection manager configured to provide mapping of one or more resources to the one or more services.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

The present invention comprising system and methods for scalable cloud-based platform and related applications will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Furthermore, although steps or processes are set forth in an exemplary order to provide an understanding of one or more systems and methods, the exemplary order is not meant to be limiting. One of ordinary skill in the art would recognize that the steps or processes may be performed in a different order, and that one or more steps or processes may be performed simultaneously or in multiple process flows without departing from the spirit or the scope of the invention. In other instances, specific features, quantities, or measurements well known to those of ordinary skill in the art have not been described in detail so as not to obscure the invention. It should be noted that although examples of the invention are set forth herein, the claims, and the full scope of any equivalents, are what define the metes and bounds of the invention.

For a better understanding of the disclosed embodiment, its operating advantages, and the specified object attained by its uses, reference should be made to the accompanying drawings and descriptive matter in which there are illustrated exemplary disclosed embodiments. The disclosed embodiments are not intended to be limited to the specific forms set forth herein. It is understood that various omissions and substitutions of equivalents are contemplated as circumstances may suggest or render expedient, but these are intended to cover the application or implementation.

The term "first", "second" and the like, herein do not denote any order, quantity or importance, but rather are used to distinguish one element from another, and the terms "a" and "an" herein do not denote a limitation of quantity, but rather denote the presence of at least one of the referenced item.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

One or more embodiments of the invention comprises a high scalability and extendable server application (or "Agent") that provides microservice style processing using bidirectional communication over persistent connections on a digital network. The server application removes the need for traditional microservices that are run as their own system processes or applications by providing a plugin interface for services to be run inside the Agent as part of its process(es).

The Agent removes many of the requirements of typical microservice architectures by consolidating foundational requirements like inter-server communication and client authentication into a common, consistent interface for services. The Agent also handles communications with many different types of clients over a consistent interface.

The services may be written and run within the Agent without the service creator (or developer) having to understand the underlying architecture or worry about the implementation or transport. The service creator may understand that by the time a service is being called, all server level validation may have been completed. Services are therefore highly focused and customizable for different applications without the server overhead.

Agent nodes may be run across multiple physical and virtual host instances and sites to act as one 'cluster' over a partial or full mesh network. This cluster is responsible for the intercommunication between Agents, their services and their clients. Services may be unaware of how the communication happens between Agents and their attached Clients and therefore remain focused on their specific roles.

Clients may use a consistent Application Programming Interface (API) that handles the persistent connection on their side.

One or more embodiments of the present invention will now be described in more detail with references to FIGS. 1-8.

Figure 1:
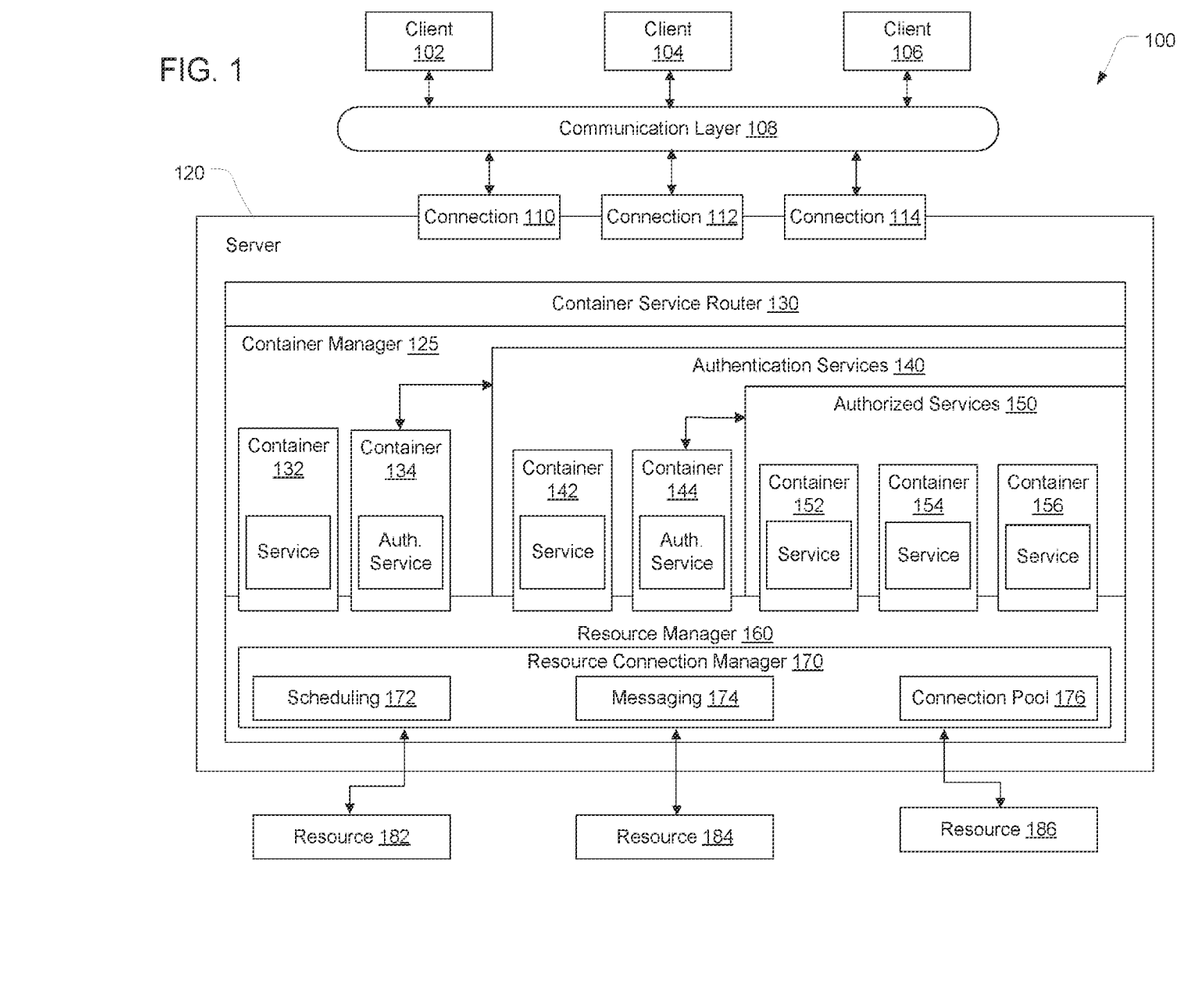
FIG. 1 is a high level illustration of the system for scalable cloud-based computing agent in accordance with one or more embodiments of the present invention.

One or more embodiments of the present invention comprises a server application or platform 120, also referred to herein as an Agent 120, for application level containerization of services and to provide shared resource management, via resource connection manager 170, to the services (e.g. 132, 134, 142, 144, 152, 154, 156) thus allowing the services to focus on the business logic without the added burden required for microservices wherein each service also manages its own access to resources, e.g. 182 to 186. In one or more embodiments, the services are abstracted from the resource management function and run inside of the server application, as illustrated in FIG. 1.

The containerization and abstraction allows each service to be run as its own virtual application in the server 120. Thus extending the containerization model for resource management and utilization into the application level. The server application 120 provides more services with the same level of hardware resources by removing extra interfaces and resource needs. The server application 120 may also be run inside of a system level containerization host (e.g. Linux Container) or virtual machine.

The server application may be run on any host, local or cloud, with supporting resources. The server application may be placed into a System Container, e.g. Virtual Machine or on "Bare Metal" (i.e. no virtualization), and run anywhere the host operates. This flexibility results in high availability and scalability via various hosting solutions.

The server application 120 provides an interface for connection (e.g. 110, 112, 114) by one or more clients (e.g. 102. 104, and 106) via connection layer 108, generally by maintaining a persistent network connection (though it is not required), to request processing of services. For instance, a Client, e.g. 102, sends a request, with required parameters, to a given service, e.g. 152, and receives an optional response upon completion of the service, depending on if the request requires a response or is "fire & forget".

The server application 120 may provide access to resources via a Resource Manager 160. The resources may vary from internal communications within the server application, to external data sources and processes such as, but not limited to, databases, HTTP servers and messaging servers.

Processing a service may occur by first requesting the service the client wants (e.g. account login) with a given set of parameters (e.g. "user name" and "password") and then receiving the response (e.g. a "connection key"). The requested service is first handled by a Service Router 130, which then determines which service to pass the parameters to and the requirements to communicate with the service. Services may have request requirements such as authentication (e.g. 140) and access control via authorization (e.g. 150), both of which may be controlled by containerized services, e.g. 134.

In one or more embodiments, service requests are identified and tracked by the host application. Tracking information may be passed to the server application, maintained over the lifetime of the request and returned as part of the response.

The parameter requirements and response data for each service are predefined. The services may also receive resources from the server application (i.e., Agent 120) running the service via the resource manager 160. For example, if a service requests a connection to a resource (e.g. database), the server application creates the actual connection (if it's not already there) and then becomes owner of the connection. The server application may then give the service a virtual connection (or "handle") with which it can talk with the database. The server application may also provide other services virtual connections to the resource thus enabling use of the same resource, e.g. data source, by multiple services with reduced connection requirements on the resource.

This resource sharing may allow for the more efficient and granular resource usage. This reduced resource usage per service allows the server application to be more easily replicated and scaled (e.g. clusters, multiple hosted server applications) depending on needs. Resource sharing may also remove much of the burden of resource management from the developer of the service, so the service may focus on the task it is designed to perform (i.e. "Business Logic").

Services may be chained into "Service Chains", allowing the developer to use a "building block" approach to leverage existing Services and mix them in with their own. This may reduce resource duplication, abstracts from other services and provides reduced development cycles. The Service Chain may work by passing in the request parameters into the first service and then sending its processed result in to the next as request parameters. The last Service in the chain may then return the result to the Client.

Services and Service Chains may also be placed into a Task Queue, managed by the resource manager 160, where the response may return to the client at a later point in time. This may free up the Client to do other things without having to wait for the response for services, which may take a little longer to process. In that case the Client may be given an initial response informing that a completed response will be returned later. The eventual result may be the returned with the tracking ID and completed response message. An example of a process that might take a longer processing time is filtering a large dataset, compressing a video source or generating a large PDF file.

Figure 2:
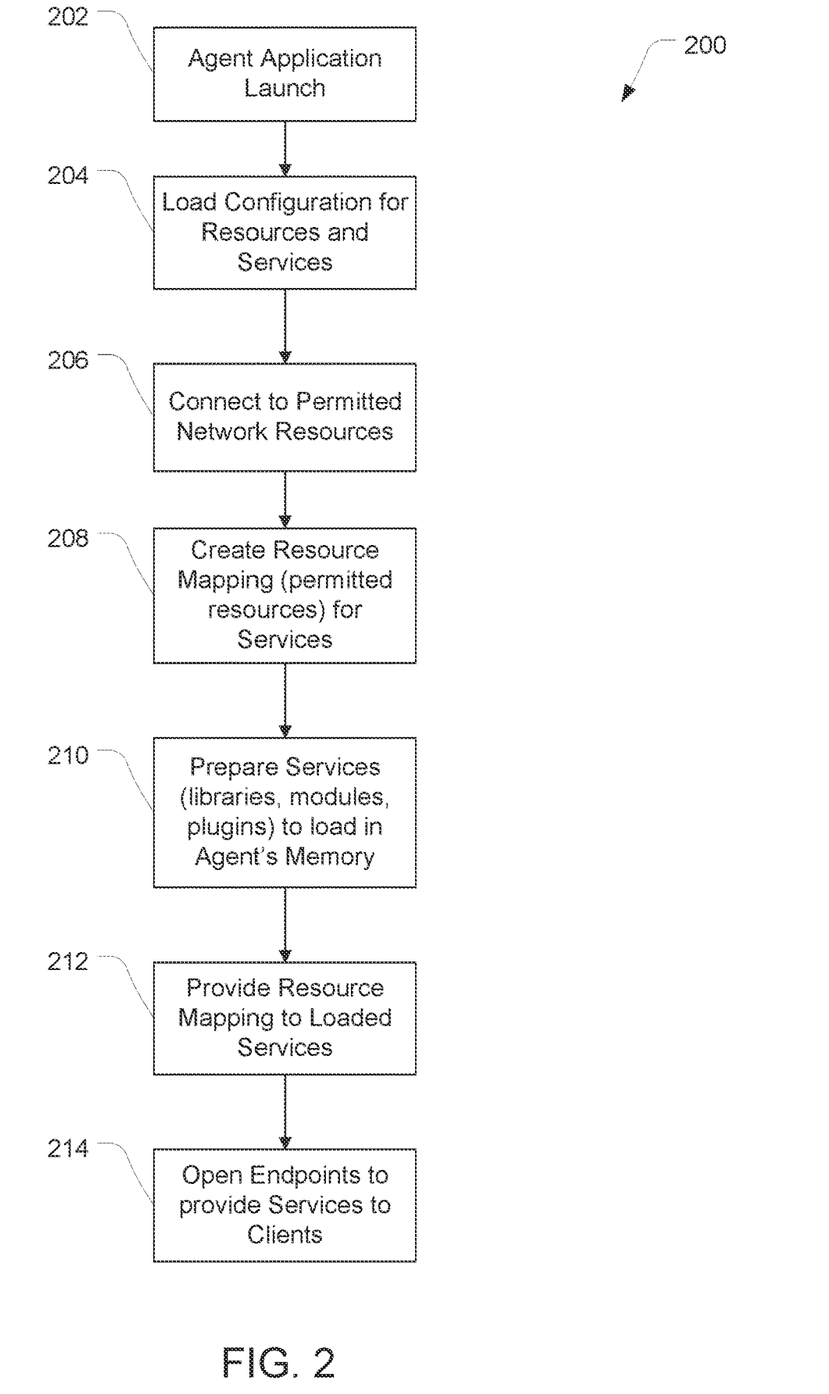
FIG. 2 is a flowchart illustration of the launch cycle of the cloud-based computing agent in accordance with one or more embodiments of the present invention.

FIG. 2 is a flowchart illustration of the launch cycle 200 of the cloud-based computing Agent 120 in accordance with one or more embodiments of the present invention. As illustrated, at block 202, the Agent 120 application is launched. The Agent 120 software can be written for example as a script, byte compile application or native application and the launch process is handled by the native Host Operating System's launch cycle. The Launching of the software on the host can be managed and monitored by the Infrastructure set-up by the operator.

After launch, the system proceeds to 204 to load the configuration descriptions for resources and services. Configuration descriptions can be included in the Agent 120 application or are loaded by the Agent 120 software in any software readable format from such examples as file system or network service. These configurations can range from plain text to fully encrypted data sources only readable by the Agent 120 application. These can be loaded from anywhere the Agent 120 software has access to. For example, large deployments will most likely be from a single managed repository/server but for small deployments it may be as simple as a locally stored text file on the host OS.

The system then proceeds to step 206 to connect to network resources for which permission has been obtained. If the Agent 120 does not already have network connections to the resource, it will work to establish one based on the infrastructure's credentialing requirement (e.g. password, token, pub-private key, etc.) and maintain the connection for whichever services require it. The list of resources can be explicitly provided or inferred by the services being loaded.

The system then proceeds to step 208 to create resource mapping for the services. Based on service configuration and requirements, the Agent 120 application provides a connection manager 170 that maps the real Application level connection to a resource or resource subset and provides it to the service that functions like any regular input/output connection, code variable or object. This mapping is unique and transparent to each service and provides an abstraction layer for extra data control by the operators. This connection manager is immutable after creation. Any modifications to the data transmitting through the connection manager 170 is handled at this level (i.e., prefixing keys, DB tables, REST endpoints, protocol buffers, etc.). The connection manager will share the network connections to resources, e.g. 182-186, internally without the Services being aware. These resources can be anywhere from full access to a database server, to limited access to a couple of records in a Cache Table. Either way they are provided abstracted so the service is unaware of the underlying infrastructure. This provides security and efficiency, by limiting access to resources.

At step 210, the system prepares and loads the services in the Agent's 120 memory. For example, depending on configuration, the Agent 120 Application, through container manager 125, will load the libraries, modules, code base that make up the Services into memory or be ready to load into memory on demand when required by the services. The container manager 125 loads and processes each service in a separate container. Each service runs in its own address space, is scheduled by the application and/or the operating system, and can fail independently.

At step 212, the system provides resource mapping to the loaded services. For instance, the Agent 120 provides the appropriate mapping handles to the service that requires it. This makes sure each Service gets access to only the resources it needs.

At step 214, the system opens endpoints to provide services to Clients. For instance, once all resources are connected and services are loaded, the Agent 120 Application is now ready to accept connections from Clients on the endpoints provided (such as HTTP, Sockets, WebSocket, File Handles, etc.). Once the Agent 120 is launched, the system is then ready for the server lifecycle of a client connection.

Figure 3:
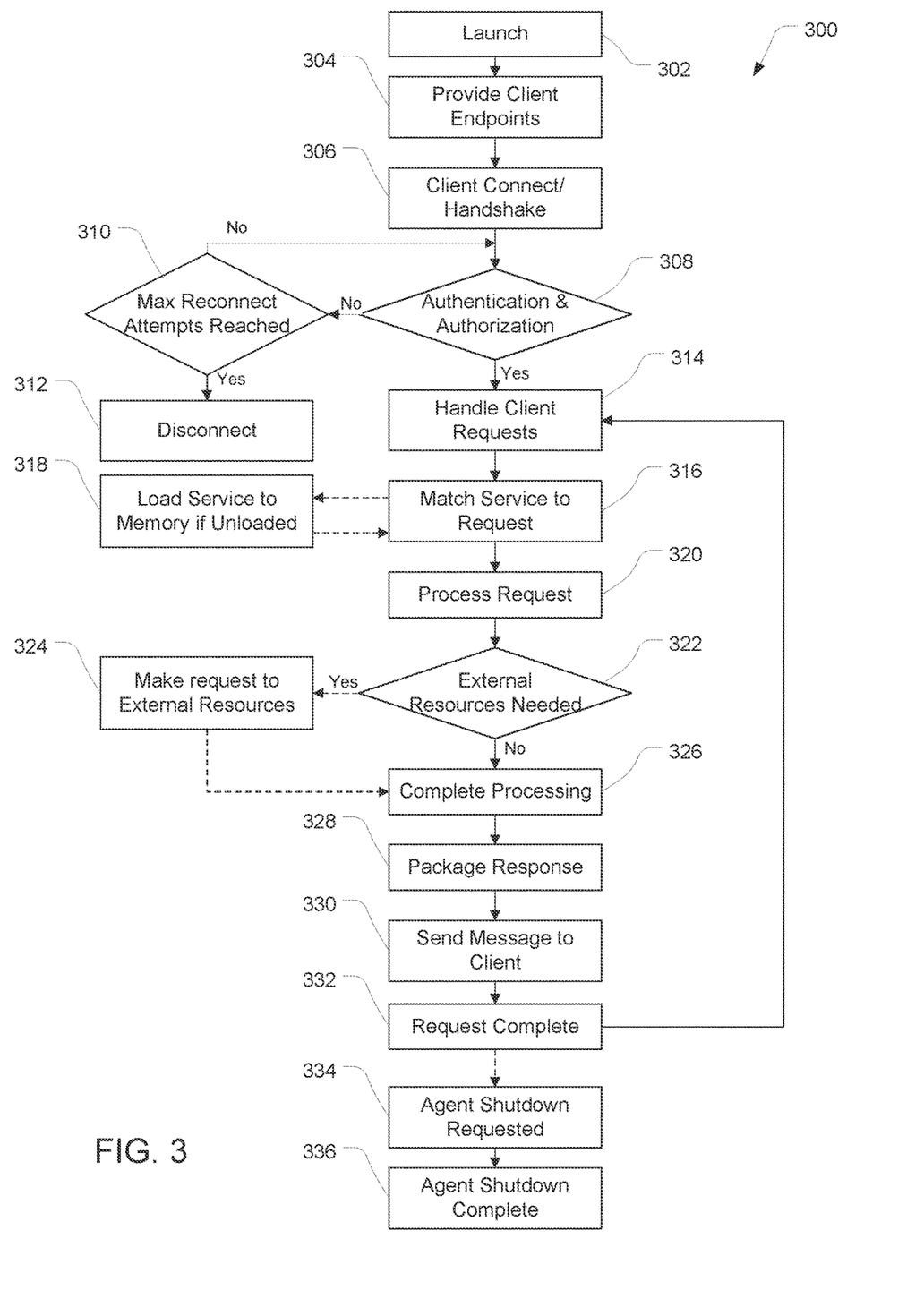
FIG. 3 is a flowchart illustration of the server lifecycle of the cloud-based computing agent in accordance with one or more embodiments of the present invention.

FIG. 3 is a flowchart illustration of the server lifecycle 300 of the cloud-based computing Agent 120 in accordance with one or more embodiments of the present invention. As illustrated, at step 302, the system initiates the launch thereby triggering the execution process 200 to initiate the Agent Launch Cycle. Upon completion of process 200, the system returns to step 304 to provide Client endpoints, which is essentially the completion of the Agent launch cycle 200.

At step 306, the system enables Clients to connect, preferably using handshake type negotiation, which may be handled by the underlying code libraries used by the application.

At step 308, a determination is made if a Client, e.g. 102, that is requesting connection has been properly authenticated and authorized. The authentication is based on the appropriate credential data that is required (e.g. Biometric, password, two-factor, token, public key, etc.). The data is passed to the appropriate authenticating server on the platform over the negotiated network connection, e.g. 110. At this point the requesting client is either approved or rejected. If rejected, it's up to the Client to handle the exception as long as the authenticating server allows it (for example, it can lockout the account/connection if too many failed attempts occur in a period of time) i.e. at step 310. After a maximum number of unsuccessful attempts, the client is forcefully disconnected at block 312. That is, in the case of failed login attempt, based on criteria configured in the application, a disconnect can be triggered and the connection dropped.

However, if at step 308, it is determined that the client is authenticated and authorized to use the system, client is approved, the client is then matched with the proper level of authorization and the system proceeds to step 314. This information is immutable and exists as long as the client is connected to the Agent 120 Application.

At step 314, the system waits for a request to come in from the connected client for further processing. For instance, the request may come in from step 608 of FIG. 6 for new requests, or from step 322 for pending requests. Upon receipt of the client request, which may be in the form of a message, the system proceeds to step 316 to process the request.

At step 316, the system matches a service to the received client request. For instance, once a request comes into the Agent 120 from the client, it is first checked to see which service is being requested based on parameters passed in the message.

If the service is not already loaded in the Agent 120 memory, the system proceeds to block 318 to load the service into memory. This may be an optional setup wherein the service is either not loaded at startup (because it's not often used) or has timed-out in its usage and therefore was unloaded. If this type of setup is used, the service gets loaded at step 318.

At step 320, the request and resources are pre-processed as needed and provided to the service. At step 322, the system determines if the service needs to communicate with an external resource or can complete the request without external resources.

If one or more external resources are needed, the system proceeds to step 324 to request the external resources. In the case the service needs to communicate with an external resource, the service makes the request through the connection manager 170 and notifies the Agent 120 Application that it is waiting on a response. The service can queue itself on a process queue to wait for a response (such as an asynchronous processing queue) to free resources from blocking other services from processing.

At step 326, the service is processed and then handed to either the next service (if it is part of a chain of services) or a response is returned to the application to either complete (i.e. terminating service) or package a response (i.e. responding service) to send to the client.

Figure 6:
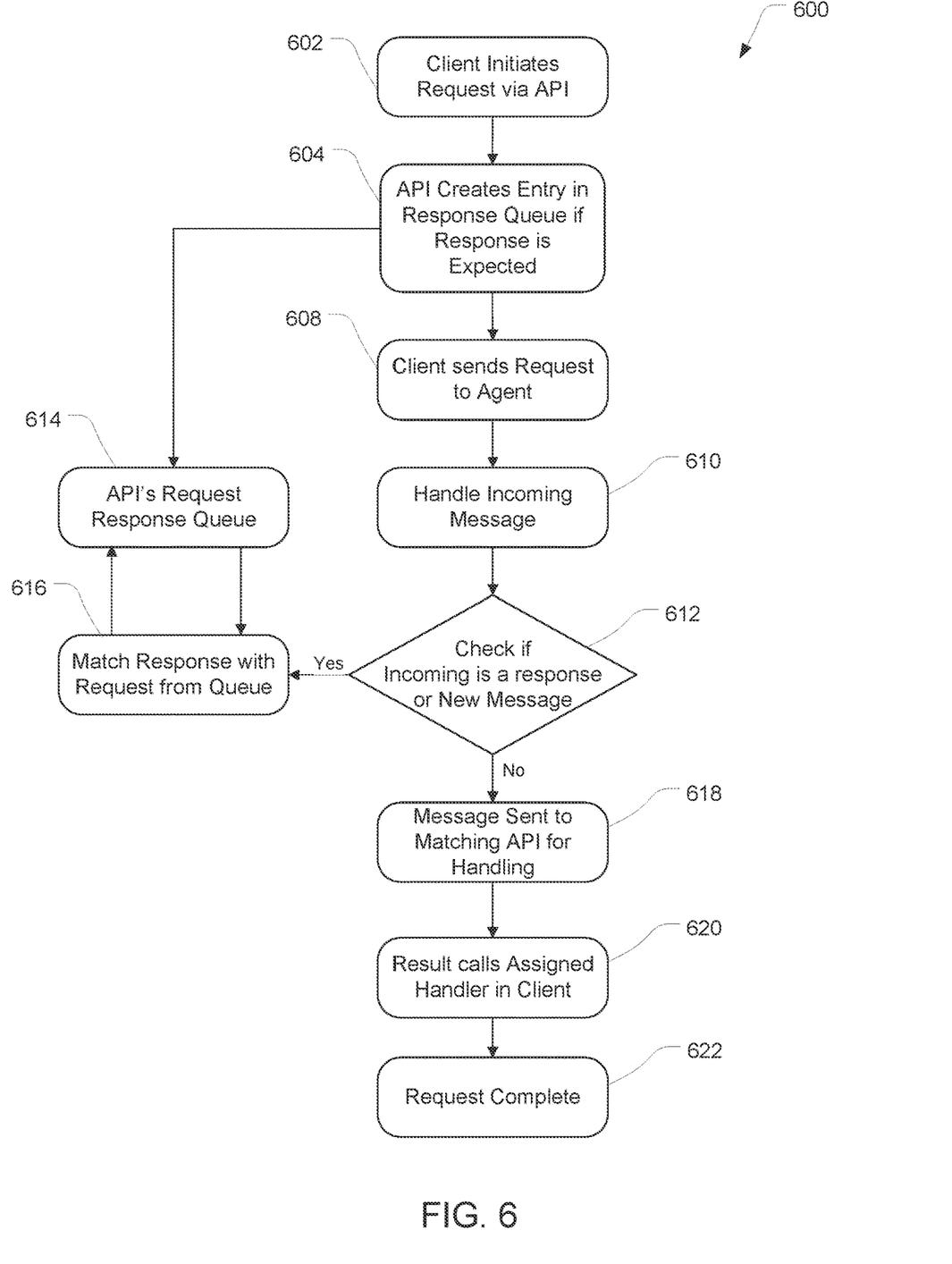
FIG. 6 is a flowchart illustration of the client request lifecycle of the cloud-based computing agent in accordance with one or more embodiments of the present invention.

At step 328, the service response is then packaged in the appropriate format for the client. And at step 330, the packaged response message is sent to the client, e.g. 102, via the network connection, e.g. 110, at block 610 (FIG. 6).

At step 332, the system confirms that the response message has been delivered to the client. Once the response is confirmed delivered to the client, the processing of the service is considered complete and any leftover data from the service may be de-allocated from memory to free up memory for new service requests. At this point, the system either returns to step 314 to handle new client requests or optionally proceeds to the agent shutdown process 400 (i.e. FIG. 4), if no other service requests are pending.

Figure 4:
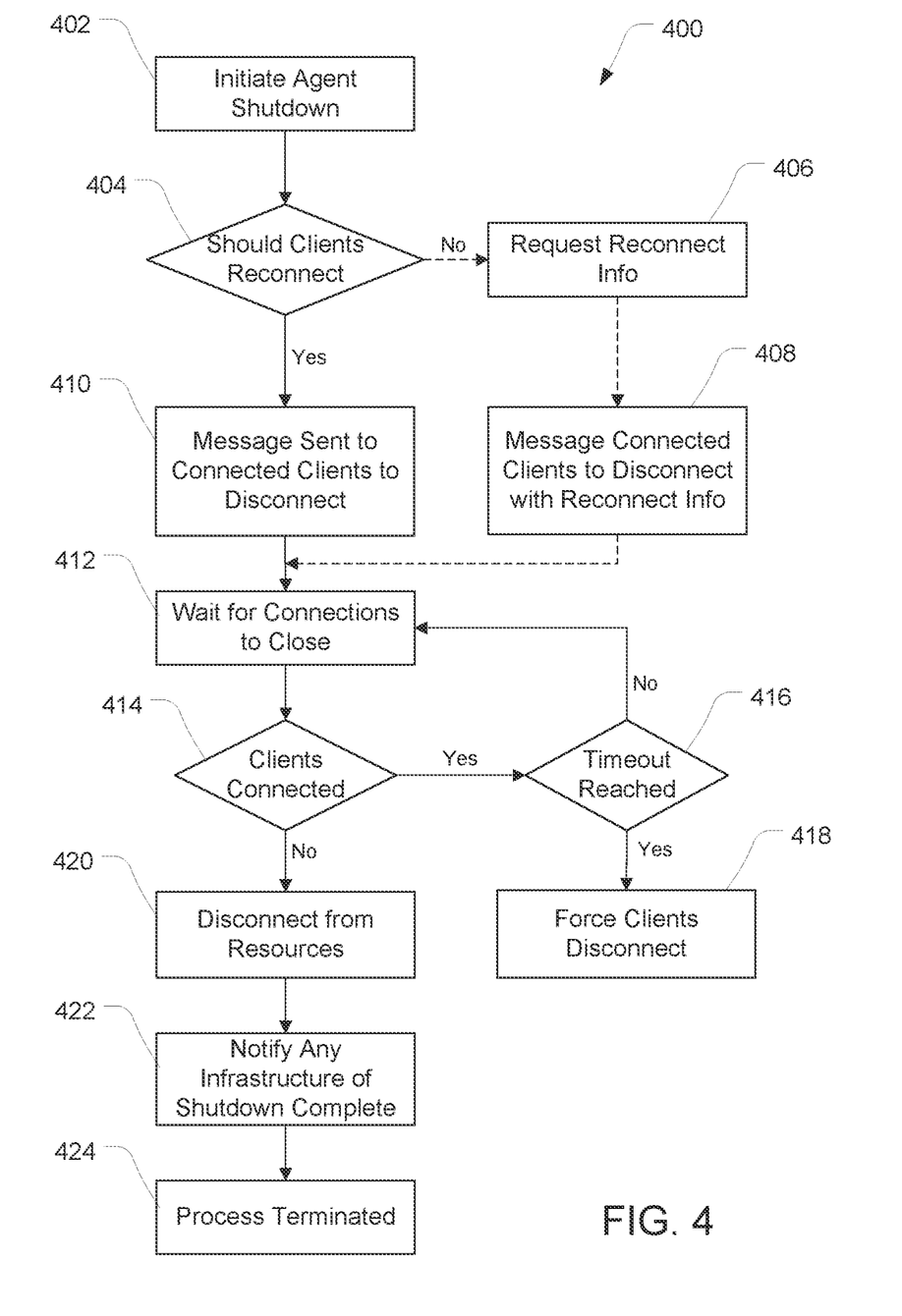
FIG. 4 is a flowchart illustration of the shutdown cycle of the cloud-based computing agent in accordance with one or more embodiments of the present invention.

At step 334, the system calls the agent shutdown process 400. This can occur, for instance, when the Agent 120 gets a signal to shut-down from such entities as the host operating system, infrastructure management or container management, it enters into a process to manage itself to shutdown gracefully. Once the Agent 120 shutdown processing is complete, the application returns to step 336, where it exits just as any application does on its host.

FIG. 4 is a flowchart illustration of the shutdown cycle 400 of the cloud-based computing Agent 120 in accordance with one or more embodiments of the present invention. As illustrated, the Agent Shutdown is initiated at step 402. Shutdown may be accomplished, for instance, by no longer accepting new client connections. This includes notifying any infrastructure of a shutdown if the system is configured with such options.

At step 404, a determination is made if clients should reconnect. If not, a message is sent to Connected Clients to disconnect at step 410. For instance, Clients may be sent a message that they are being disconnected without any new reconnect information.

However, if at step 404 it is determined that clients should reconnect to another Agent 120, then reconnection information is requested from the infrastructure (step 406). This redirection may be due to planned shutdown of some infrastructure, in which case, the clients may be redirected to another Agent 120 in the cloud, for example. If clients are being redirected to other Agents 120, at step 406 the system obtains from the infrastructure the information of where the clients are to reconnect to. The system then sends a message in the form of a response to the connected clients to disconnect and also provides the reconnect information (in the message response), at step 408.

At step 412, the system then waits for all the connections to close. For instance, this may be accomplished by continuously checking for when all the clients are disconnected.

At step 414, a determination is made if any clients are still connected to the Agent 120. If clients are still connected, the system continues in the loop, i.e. 412 to 416, until all clients are disconnected or a timeout is reached.

At step 416, if it is determined that the timeout limit is reached, the system forces the clients to disconnect, step 418. This means termination of all Client connections currently attached to the Agent 120. If all the clients are disconnected, then at step 420, all external resources connected to the Agent 120 disconnect from the Agent 120.

Once all resources are disconnected, if configured, the system optionally notifies the infrastructure of its pending shutdown, step 422. The shutdown process terminates at step 424.

Figure 5:
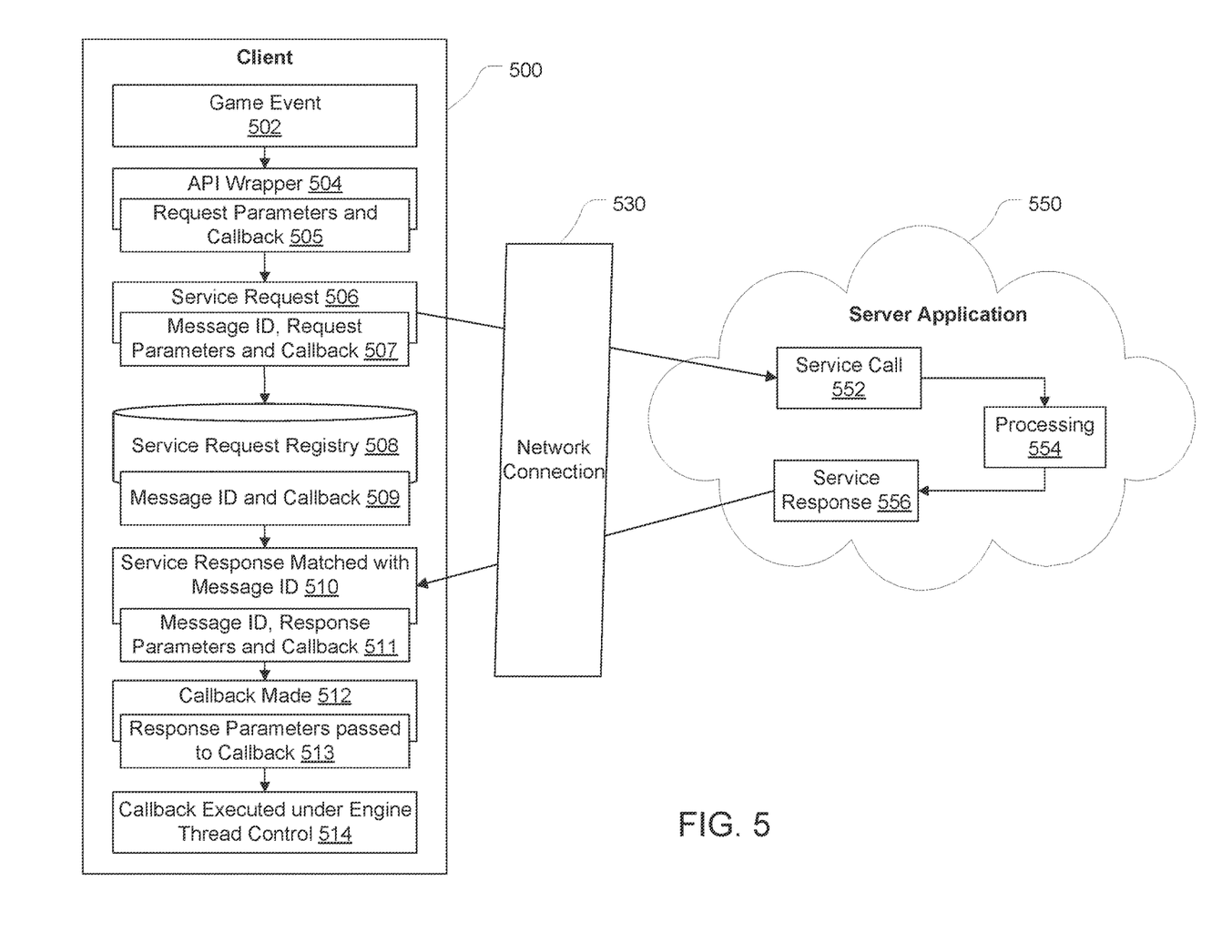
FIG. 5 is an illustration of the client-server interface of the cloud-based computing agent in accordance with one or more embodiments of the present invention.

FIG. 5 is an exemplary illustration of the client-server interface of the cloud-based computing Agent 120 in accordance with one or more embodiments of the present invention. As illustrated, a game client 500 wanting to participate in an online gaming event 502, initiates a connect request via API 504. The API ("Application Programming Interface") prepares the request parameters and callback information (i.e. 505). The API then initiates a service request 506 with a Message ID, request parameters and callback information (i.e. 507) and sends the service request to the server application 550 (also referred to herein as the Agent 120), which is in the cloud, over a persistent network connection 530. The server application receives a service call 552, loads and processes the service 554. The server application then prepares and sends a service response 556 to the client at 510.

In the meantime, the API saves the service request information in registry 508. The service request information includes Message ID and callback information (i.e. 509).

At 510, the client receives the service response and matches it with the message ID. This may be accomplished using the Message ID, response parameters, and callback information (see 511).

At step 512, the callback is made to the client API with the response parameters, (see 513). And at step, the callback is executed under control of the client.

The client request lifecycle is illustrated in more detail in FIG. 6, which is a flowchart illustration of the client request lifecycle 600 of the cloud-based computing Agent 120 in accordance with one or more embodiments of the present invention.

As illustrated, the client initiates a request via the API. Client formulates the request it is going to make and sends them to the API at block 602. This occurs after the client has been authenticated and authorized (see block 308). In one or more embodiments, the API packages the request into a format ready for transmission with any extra metadata (e.g. parameters) needed for processing by the server and services.

At step 604, the API determines is a response to the request is expected from the Agent 120. If response is expected, the API Creates entry in the response queue, block 614. If the request is the type that has a client defined handler (i.e. callback), the handler is flagged as expecting a response. In one or more embodiments, the API adds a "Message ID" or similar flag (e.g. message receipt) to track the response and match it to the request when the message comes back. After the request is added to the API's Request Response Queue, 614, the process waits for responses from the Agent 120.

At block 608, the client API sends the request to the Agent 120. In one or more embodiments, the API makes a call over the negotiated connection and transmits the data to the Agent 120 at block 314 (see FIG. 3), for handling of the request.

At block 610, the client receives incoming messages from the Agent 120. The message may originate from block 330 (FIG. 3) of the Agent 120, for instance. In one or more embodiments, a response message is packaged and sent from the Agent 120 to the client. This means that handling of the response message at the client includes unpacking to extract all the information, which is then passed to the API for handling the response.

At block 612, a determination is made if incoming message is a response or new message. If there is a message receipt in the packaging, it is then sent to the Request Response Queue 614 to see if there is a matching Request.

At block 616, the API matches the response with the appropriate request from Queue. For instance, when a response is received from the Agent 120, the API checks the message to see if it matches any requests that were previously sent.

At block 618, the message is sent to API for handling. In the case that there is a matching request, the handler from the request is returned to the response handler for further processing. For instance, at block 620, the response is handed to the appropriate handler in the client for further processing.

In one or more embodiments, once the handler is called, the response is cleaned up and removed from any queues and memory at block 622.

Figure 7:
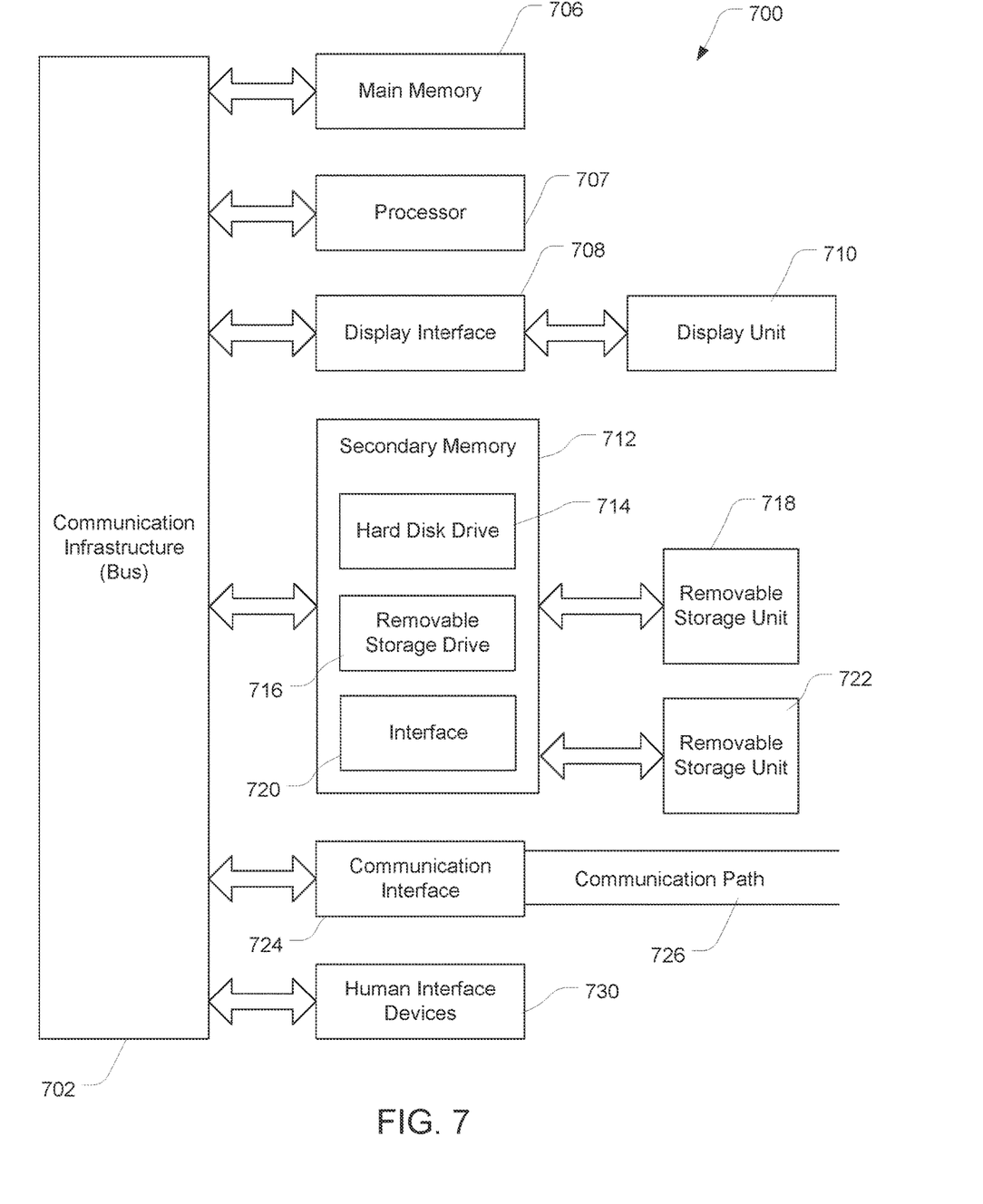
FIG. 7 illustrates a computer and peripherals that when programmed as described herein may operate as a specially programmed computer capable of implementing one or more methods, apparatus and/or systems of the present invention.

FIG. 7 is an illustration of a computer and peripherals, which when programmed as described herein, may operate as a specially programmed computer capable of implementing one or more methods, apparatus and/or systems of the solution described in this disclosure. Processor 707 may be coupled to bi-directional communication infrastructure 702 such as communication infrastructure system bus 702. Communication infrastructure 702 may generally be a system bus that provides an interface to the other components in the general-purpose computer system such as processor 707, main memory 706, display interface 708, secondary memory 712 and/or communication interface 724.

Main memory 706 may provide a computer readable medium for accessing and executing stored data and applications. Display interface 708 may communicate with display unit 710 that may be utilized to display outputs to the user of the specially-programmed computer system. Display unit 710 may comprise one or more monitors that may visually depict aspects of the computer program to the user. Main memory 706 and display interface 708 may be coupled to communication infrastructure 702, which may serve as the interface point to secondary memory 712 and communication interface 724. Secondary memory 712 may provide additional memory resources beyond main memory 706, and may generally function as a storage location for computer programs to be executed by processor 707. Either fixed or removable computer-readable media may serve as secondary memory 712. Secondary memory 712 may comprise, for example, hard disk 714 and removable storage drive 716 that may have an associated removable storage unit 718. There may be multiple sources of secondary memory 712 and systems implementing the solutions described in this disclosure may be configured as needed to support the data storage requirements of the user and the methods described herein. Secondary memory 712 may also comprise interface 720 that serves as an interface point to additional storage such as removable storage unit 722. Numerous types of data storage devices may serve as repositories for data utilized by the specially programmed computer system. For example, magnetic, optical or magnetic-optical storage systems, or any other available mass storage technology that provides a repository for digital information may be used.

Communication interface 724 may be coupled to communication infrastructure 702 and may serve as a conduit for data destined for or received from communication path 726.

A network interface card (NIC) is an example of the type of device that once coupled to communication infrastructure 702 may provide a mechanism for transporting data to communication path 726. Computer networks such Local Area Networks (LAN), Wide Area Networks (WAN), Wireless networks, optical networks, distributed networks, the Internet or any combination thereof are some examples of the type of communication paths that may be utilized by the specially programmed computer system. Communication path 726 may comprise any type of telecommunication network or interconnection fabric that can transport data to and from communication interface 724.

To facilitate user interaction with the specially programmed computer system, one or more human interface devices (HID) 730 may be provided. Some examples of HIDs that enable users to input commands or data to the specially programmed computer may comprise a keyboard, mouse, touch screen devices, microphones or other audio interface devices, motion sensors or the like, as well as any other device able to accept any kind of human input and in turn communicate that input to processor 707 to trigger one or more responses from the specially programmed computer are within the scope of the system disclosed herein.

While FIG. 7 depicts a physical device, the scope of the system may also encompass a virtual device, virtual machine or simulator embodied in one or more computer programs executing on a computer or computer system and acting or providing a computer system environment compatible with the methods and processes of this disclosure. In one or more embodiments, the system may also encompass a cloud computing system or any other system where shared resources, such as hardware, applications, data, or any other resources are made available on demand over the Internet or any other network. In one or more embodiments, the system may also encompass parallel systems, multi-processor systems, multi-core processors, and/or any combination thereof. Where a virtual machine performs substantially similarly to that of a physical computer system, such a virtual platform will also fall within the scope of disclosure provided herein, notwithstanding the description herein of a physical system such as that in FIG. 7.

Figure 8:
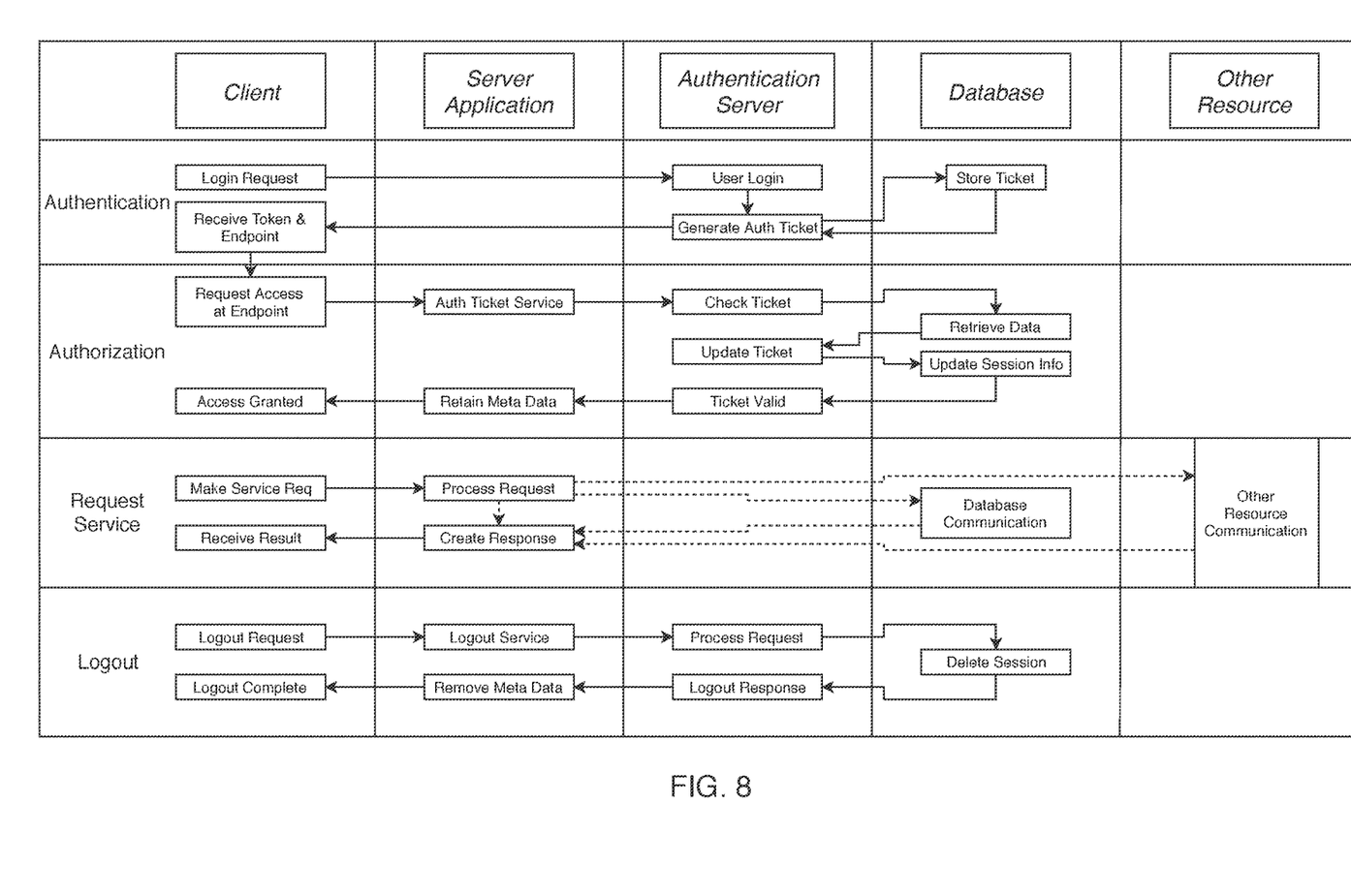
FIG. 8 is an illustration of the service interface of the cloud-based computing agent in accordance with one or more embodiments of the present invention.

FIG. 8 is an illustration of the service interface of the cloud-based computing Agent 120 in accordance with one or more embodiments of the present invention.

Services that are run on top of Agent 120 or another platform may include audience participation for spectating live events (as non-limiting examples, Competitive E-Sport, Music Concerts, Media Broadcasts and Live Streams, etc.).

In other embodiments, compute cluster may assist in machine learning or artificial intelligence, this aspect may free up resources in order to provide a more efficient data processing.

In other embodiments, as a non-limiting example the invention may control machines remotely or control a cluster of machines or computing units.

In other embodiments, intercommunication between devices (IoT, etc.) may be facilitated by the platform to reduce or remove the knowing of the native interfaces of each client or host. As more devices are being constructed with compute and sensor capabilities, and capacity for interconnectivity increases (ex., 5G wireless expansion, etc.) the dependency on an intermediary platform to provide intercommunication that can be run efficiently at scale may also increase.

This intercommunication between consumers and providers may range in complexity. For example, autonomous devices or agents (Autonomous vehicles, drones, etc.) may communicate with external devices and each other as close to real time as possible, to better perform their expected duties. As a non-limiting example, an Autonomous Long-Haul Tractor Trailer may need to both talk with intelligent sensors, the network, or sensors on the road while at the same time communicate back to a monitoring site about its position, speed and operating parameters.

In other embodiments, intercommunication between distinct or related devices may be transmitting patient information to doctors or hospital monitoring systems to intercept a traumatic event in progress and notify response systems to dispatch services as quickly as possible or notify a patient how to remedy a situation.

In other embodiments, communication between environmental monitoring devices such as air, weather, earthquake sensors may help monitors like Human or Artificial Intelligence to gather information that can gather information to help better study trends and understand patterns, to provide data during an active event, or to notify the systems of a pending event to provide warnings so action can be taken.

In other embodiments, the platform may be used for enhanced audience participation in transmitted events. As a non-limiting example, viewers of a live broadcast talent show may vote for their favorite performers. The system can then integrate the results being tallied in real-time into the broadcast for viewers to see. Fans viewing sports may help cheer on their favorite team from the comfort of their own home.

In other embodiments, military systems may exchange information in real time efficiently, to provide better situational awareness to multiple entities, autonomous or human, on the battle field, in an operation at a command center or during daily duties to help provide the most accurate data possible.

In other embodiments, resource extraction may use the platform to intercommunicate between devices and to monitor progress. As a non-limiting example, sensors located on a Petroleum extraction rig may provide pressure monitoring, thermal monitoring to predict pending issues, monitor progress and maximize efficiency.

In other embodiments, the extra service processing inside the platform, communication companies such as Telecomm or Internet Service Providers, may efficiently handle inter-messaging between devices such as text messaging but also provide extra processing on messages to provide extra data, input, or media output.

While the invention herein disclosed has been described by means of specific embodiments and applications thereof, numerous modifications and variations could be made thereto by those skilled in the art without departing from the scope of the invention set forth in the claims.

What is claimed is:

1. A system for scalable cloud-based applications comprising:
   a network server comprising:
      a processor configured to execute code;
      a memory accessible to the processor and configured to store code; and
      a server application stored as code on the memory that, when executed by the processor, causes the network server to instantiate an agent configured to run inside itself, as part of its own processes, a plurality of chained services and to place at least one of the plurality of chained services into a task queue according to a prioritization of one or more of a plurality of clients, wherein the agent comprises:
         a service router module configured to maintain a persistent network connection with at least one of the plurality of chained services from at least one of the plurality of clients;
         a container manager module configured to load and process each one of the plurality of chained services within a single host; and
         a resource connection manager module configured to provide, within the agent, a unique mapping of one or more resources to the at least one of the plurality of chained services, wherein the one or more resources are provided in an abstracted form to the at least one of the plurality of chained services.

2. The system of claim 1, wherein each of the plurality of chained services is loaded and processed within the agent.

3. The system of claim 1, wherein each of the plurality of chained services is processed as a plug-in application within the agent.

4. The system of claim 1, wherein the one or more resources comprises external data sources and processes.

5. The system of claim 1, wherein the service router module is configured to match a client's request to a corresponding one of the plurality of chained services.

6. The system of claim 1, wherein the resource connection manager module is configured to provide an individual mapping of each of the one or more resources to each one of the plurality of chained services.

7. The system of claim 6, wherein the individual mapping of each of the one or more resources to each one of the plurality of chained services is provided in an abstracted form such that the underlying structure of the one or more resources is unknown to the each one of the plurality of chained services.

8. The system of claim 1, wherein one of the plurality of chained services is chained to another one of the plurality of chained services that outputs a response to one of the plurality of clients.

9. The system of claim 1, wherein the service router module is further configured to authenticate each of the plurality of clients based on appropriate credential data.

10. A method for provisioning scalable cloud-based applications, comprising:
   launching, on a server, an agent application;
   loading, by the agent application, a configuration for a plurality of resources and a plurality of chained services;
   connecting, by the agent, to one or more of the plurality of resources;
   creating, by the agent, a unique mapping of the connected one or more of the plurality of resources to one or more of the plurality of chained services;
   loading, by the agent, the connected one or more of the plurality of chained services into a memory;
   providing, by the agent, the unique mapping of the connected one or more of the plurality of resources to the connected one or more of the plurality of chained services, wherein the unique mapping of the connected one or more of the plurality of resources to one or more of the plurality of chained services is provided in an abstracted form such that the underlying structure of the plurality of resources is not visible to the one or more of chained services;
   placing, by the agent, at least one of the plurality of chained services into a task queue according to a prioritization of one or more of a plurality of clients; and processing, by the agent, the connected one or more of the plurality of chained services as a plug-in within the agent.

11. The method of claim 10, further comprising:
opening, by the agent, endpoints configured to receive requests from one or more of the plurality of clients.

12. The method of claim 11, further comprising:
maintaining, by the agent, a persistent network connection with the one or more of the plurality of clients in response to receiving requests from the one or more of the plurality of clients.

13. The method of claim 10, further comprising:
chaining, by the agent, an output from a first chained service of the plurality of chained services to be an input for a second chained service of the plurality of chained services, wherein the second chained service of the plurality of chained services is configured to output a response to one or more of the plurality of clients.

14. The method of claim 10, wherein connecting, by the agent, to one or more of the plurality of resources comprises:
sending, by the agent, one or more authentication credentials to one or more of the plurality of resources.

15. The method of claim 10, wherein the server comprises one or more agent nodes on a network.

16. A computer program product for provisioning a plurality of networked resources, the computer program product comprising non-transitory computer-readable media encoded with instructions for execution by a processor to perform a method comprising:
loading, by a resource manager, a configuration for the plurality of networked resources to be associated with one or more chained services;
associating, by the resource manager, at least one of the plurality of networked resources with the one or more chained services via a unique mapping;
placing, by the resource manager, at least one of the one or more chained services into a task queue according to a prioritization of one or more of a plurality of clients; and
providing, by the resource manager, the unique mapping to the one or more chained services in an abstracted form that provides a unique access level for each of the plurality of networked resources mapped to each of the one or more chained services.

17. The computer program product of claim 16, wherein one or more of the plurality of networked resources is shared between a first chained service of the one or more chained services and a second chained service of the one or more chained services.

18. The computer program product of claim 16, wherein the resource manager is configured to maintain a persistent network connection with each of the plurality of networked resources.

19. The computer program product of claim 16, wherein the method further comprises:
sending, by the resource manager, an initial response to the one or more of the plurality of clients informing the one or more of the plurality of clients that a completed response will be returned according to the task queue.

* * * * *